(12) United States Patent
Kim et al.

(10) Patent No.: US 8,380,192 B2
(45) Date of Patent: Feb. 19, 2013

(54) METHOD AND APPARATUS FOR MANAGING PROFILE INFORMATION OF MOBILE TERMINAL IN MOBILE COMMUNICATIONS SYSTEM

(75) Inventors: Sung Han Kim, Daejeon (KR); Jong Hong Jeon, Daejeon (KR); Seung Yun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 401 days.

(21) Appl. No.: 12/668,223

(22) PCT Filed: Mar. 11, 2008

(86) PCT No.: PCT/KR2008/001368
§ 371 (c)(1),
(2), (4) Date: Jan. 8, 2010

(87) PCT Pub. No.: WO2009/008581
PCT Pub. Date: Jan. 15, 2009

(65) Prior Publication Data
US 2010/0330969 A1    Dec. 30, 2010

(30) Foreign Application Priority Data

Jul. 10, 2007    (KR) .......................... 10-2007-0068990

(51) Int. Cl.
*H04W 4/00*    (2009.01)
(52) U.S. Cl. ............... 455/435.1; 455/414.1; 455/414.4; 455/418; 709/217; 726/5
(58) Field of Classification Search ............... 455/414.1, 455/414.4, 418; 709/217; 726/5
See application file for complete search history.

(56) References Cited

U.S. PATENT DOCUMENTS

| 6,912,517 | B2 | 6/2005 | Agnihotri et al. |
| 2002/0049050 | A1* | 4/2002 | Lelong-Gilbert ............. 455/414 |
| 2006/0136395 | A1* | 6/2006 | Rhee et al. ........................ 707/3 |

FOREIGN PATENT DOCUMENTS

| KR | 1020040058355 A | 7/2004 |
| KR | 10-0585234 B1 | 5/2006 |
| KR | 1020060069143 A | 6/2006 |
| KR | 1020070026979 A | 3/2007 |
| KR | 1020070027134 A | 3/2007 |
| KR | 1020070059632 A | 6/2007 |
| KR | 1020070061117 A | 6/2007 |

OTHER PUBLICATIONS

International Search Report: PCT/KR2008/001368.

* cited by examiner

*Primary Examiner* — Amancio Gonzalez
(74) *Attorney, Agent, or Firm* — Ladas & Parry LLP

(57) ABSTRACT

A method for managing profile information of a mobile terminal in a mobile communications system includes: registering profile information of the mobile terminal at a central system via a local system, the profile information having dynamic profile information and static profile information; and registering DB (database) information of an external local system using a same profile format as that used in the central system to thereby manage the dynamic profile information and the static profile information of the mobile terminal. The method further includes registering DB information of another external local system using a profile format different from that used in the central system to thereby manage the dynamic profile information and the static profile information of the mobile terminal.

18 Claims, 4 Drawing Sheets

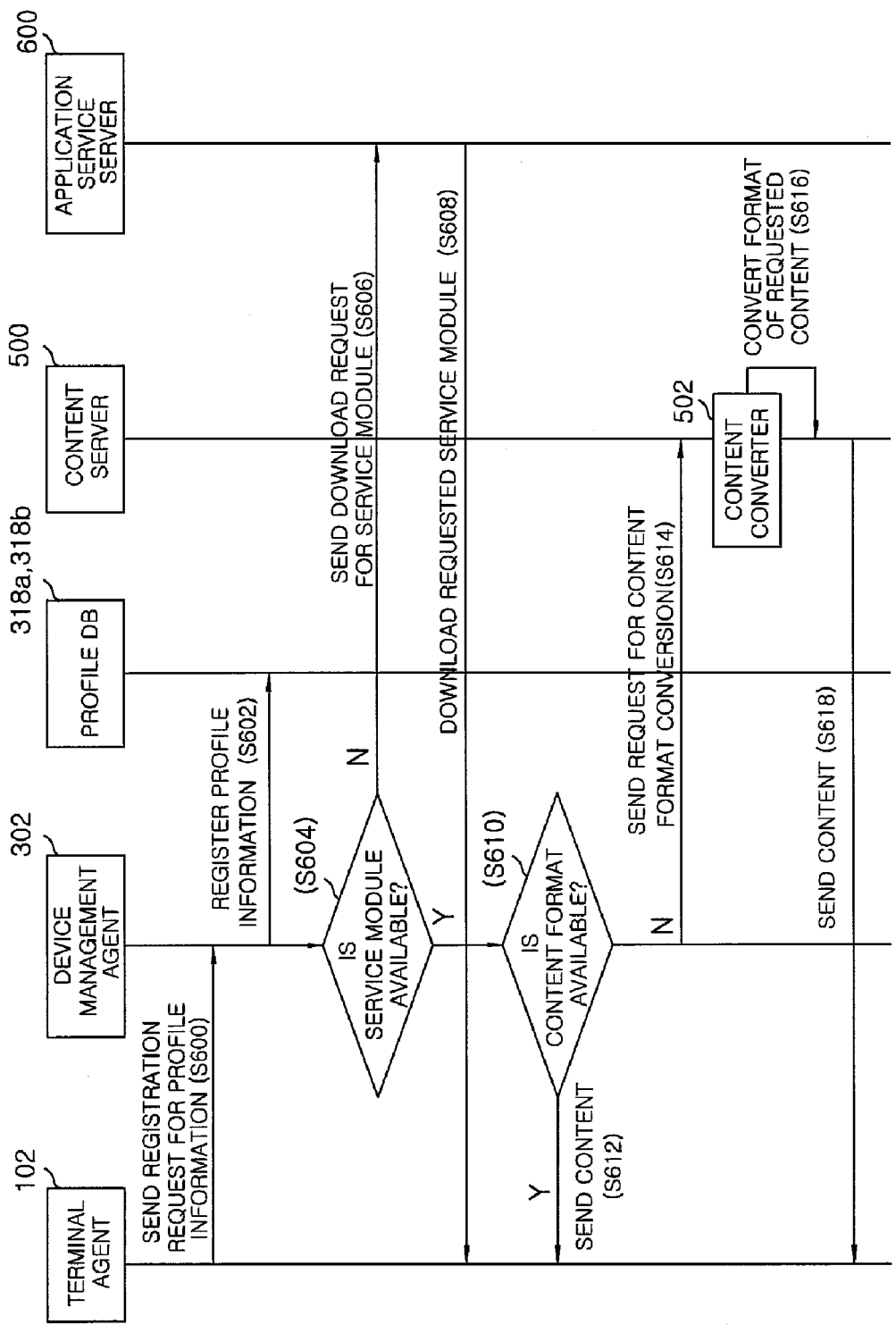

METHOD AND APPARATUS FOR MANAGING PROFILE INFORMATION OF MOBILE TERMINAL IN MOBILE COMMUNICATIONS SYSTEM

TECHNICAL FIELD

The present invention relates to management of profile information of a mobile terminal in a mobile communications system; and, more particularly, to a method and apparatus for efficiently managing dynamic profile information of mobile terminals in a mobile communications system.

This work was supported by the IT R&D program of MIC/IITA. [2007-P10-21, Development of MobileOK Standards for Next Generation Web Application]

BACKGROUND ART

A mobile terminal has hardware and software characteristics. Profile information of the mobile terminal can be dynamically changed in use after initial shipment due to, e.g., a download of an application program or an installation of a new peripheral unit.

The profile information of the mobile terminal can be used by servers for providing a highly effective service to the mobile terminal. Accordingly, effective management of the profile information has become more critical with diversification of mobile terminals in recent years, and thus new management approaches are necessary.

However, conventional profile information management for a mobile terminal has been performed on the basis of static profile information. That is, only initial profile information of the mobile terminal provided at the time of shipment is managed in the server. Furthermore, the mobile terminal itself cannot manage dynamic profile information that results from changes made by the user to the initial profile information during utilization. Hence, various changes in profile information of the mobile terminal cannot be handled in an effective and adaptive manner.

DISCLOSURE OF INVENTION

Technical Problem

In view of the above, the present invention provides a method and apparatus for managing profile information of a mobile terminal in a mobile communications system, wherein static and dynamic profile information of the mobile terminal are managed by a central management system in a consistent manner so that an efficient management environment for device profile information can be provided.

The present invention further provides a profile information management method and apparatus for a mobile terminal in a mobile communications network, wherein a central management system is provided with profile conversion facilities to support compatibility with external device management systems using different profile formats.

The present invention further provides a profile information management method and apparatus for a mobile terminal in a mobile communications network, wherein not only static profile information but also dynamic profile information of the mobile terminal is managed so that a highly effective new application service provision environment can be provided according to characteristics of the mobile terminal.

The present invention further provides a profile information management method and apparatus for a mobile terminal in a mobile communications network, wherein profile information is efficiently managed, in consideration of various changes and extensions of local environments, through a hierarchical structure including a central management system and a local system.

Technical Solution

In accordance with a first aspect of the present invention, there is provided a method for managing profile information of a mobile terminal in a mobile communications system, including:

registering profile information of the mobile terminal at a central system via a local system, the profile information having dynamic profile information and static profile information;

registering DB (database) information of an external local system using a same profile format as that used in the central system to thereby manage the dynamic profile information and the static profile information of the mobile terminal; and registering DB information of another external local system using a profile format different from that used in the central system to thereby manage the dynamic profile information and the static profile information of the mobile terminal.

In accordance with a second aspect of the present invention, there is provided a method for managing profile information of a mobile terminal in a mobile communications system including a device management agent of a device management server, profile databases having a dynamic profile database and a static profile database, a content server and an application service server, the method including:

sending, by the mobile terminal, a registration request for profile information of the mobile terminal to the device management agent;

checking, by the device management agent, whether the profile information is dynamic profile information or static profile information;

registering the profile information at the dynamic profile database or at the static profile database according to the checking result;

sending, by the mobile terminal, a request for an application service to the device management agent;

checking, by the device management agent, a type of the application service and determining whether the mobile terminal stores therein a service module appropriate for the application service;

sending, by the device management agent, a request for a download of a service module appropriate for the service to the application service server if it is determined that the mobile terminal does not have the service module appropriate for the application service;

sending, by the application service server, the service module appropriate for the application service to the mobile terminal in response to the request for the download;

determining, by the device management agent, whether a content format of the application service is available in the mobile terminal if it is determined that the mobile terminal has the service module appropriate for the application service; and sending, by the device management agent, a content to the mobile terminal if it is determined that the content format of the application service is available in the mobile terminal.

In accordance with a third aspect of the present invention, there is provided an apparatus for managing profile information of mobile terminals in a mobile communications system, including:

a terminal agent installed in each mobile terminal for sending and receiving profile information of the mobile terminal through a network, the profile information having static profile information and dynamic profile information;

a content server for providing a content to the mobile terminal;

an application service server for providing an application service to the mobile terminal; and a device management server for managing a static profile database for storing therein the static profile information and a dynamic profile database for storing therein the dynamic profile information and interoperating with the content server and the application service server.

Advantageous Effects

In accordance with the present invention, profile information of mobile terminals can be efficiently managed through a hierarchical structure, and compatibility with external systems using different profile formats can be supported by using profile conversion facilities. Further, not only static profile information but also dynamic profile information of the mobile terminals can be managed so that new application services adapted to characteristics of each mobile terminal can be provided.

BRIEF DESCRIPTION OF THE DRAWINGS

The above features of the present invention will become apparent from the following description of embodiments given in conjunction with the accompanying drawings, in which:

FIG. 6 illustrates a sequence diagram of service module and content transmission between a mobile terminal and servers using profile information in accordance with the present invention.

BEST MODE FOR CARRYING OUT THE INVENTION

Embodiments of the present invention will be described in detail with reference to the accompanying drawings, which form a part hereof.

Figure 1:
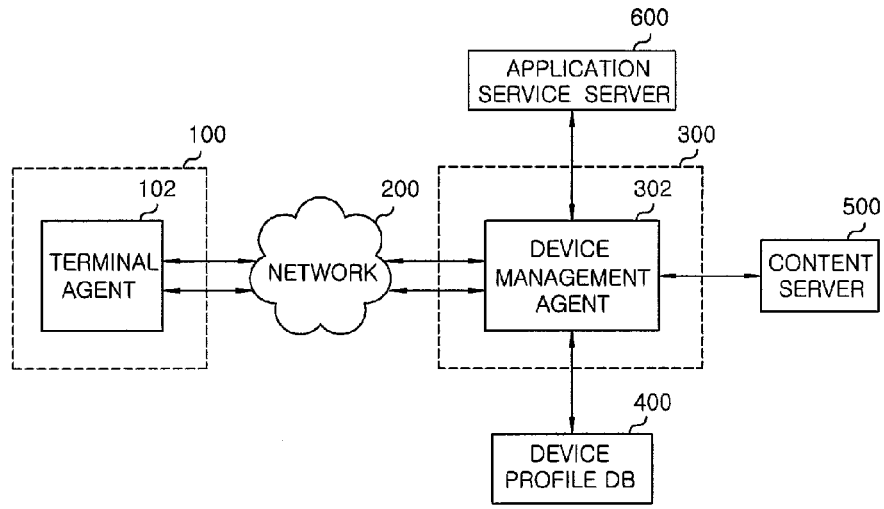
FIG. 1 illustrates a schematic block diagram of a profile information management system in accordance with the present invention.

FIG. 1 illustrates a schematic block diagram of a profile information management system in accordance with the present invention.

Referring to FIG. 1, the profile information management system includes a mobile terminal 100, a network 200, a device management server 300, a device profile database (DB) 400, a content server 500, and an application service server 600.

The mobile terminal 100 includes a terminal agent 102. The terminal agent 102 serves to transmit profile information of the mobile terminal 100 to the device management server 300 via the network 200. That is, the terminal agent 102 notifies the device management server 300 of information on the mobile terminal 100 via the network 200.

The network 200 may be a commercial mobile communications network, e.g., a CDMA (code division multiple access), a WCDMA (wideband CDMA), a Wi-Fi (wireless fidelity), or a Wibro (wireless broadband Internet) network.

The device management server 300 includes a device management agent 302. The device management agent 302 manages the device profile DB 400, and also, inter-operates with the content server 500 and the application service server 600 which may be an external system.

The device management agent 302 manages device profile information including static profile information and dynamic profile information. The static profile information includes initial specification of the mobile terminal 100 at the time of shipment thereof, and formats or details of the static profile information may be selected from those currently used in the industry and therefore the details therefore will be omitted for the sake of simple explanation. The dynamic profile information includes information changes in the specification of the mobile terminal 100 (e.g., change of a software version due to a download of new software). Both of the static profile information and the dynamic profile information are managed by the device management server 300.

The device profile DB 400 stores therein the device profile information. The device profile DB 400 includes a static profile DB for storing therein the static profile information and a dynamic profile DB for storing therein the dynamic profile information.

The content server 500 and the application service server 600 interoperate with the device management server 300 to provide a specific content or application service to the mobile terminal 100.

According to the present invention, the device profile information is managed by using a two-level hierarchical structure. The device profile information are registered or modified locally in a second hierarchy and managed overally in a first hierarchy. The second hierarchy includes schemes using profile information formats identical to those of the first hierarchy and schemes using profile information formats different from those of the first hierarchy. This hierarchical structure of the device management server 300 will be described below with reference to FIG. 2.

Figure 2:
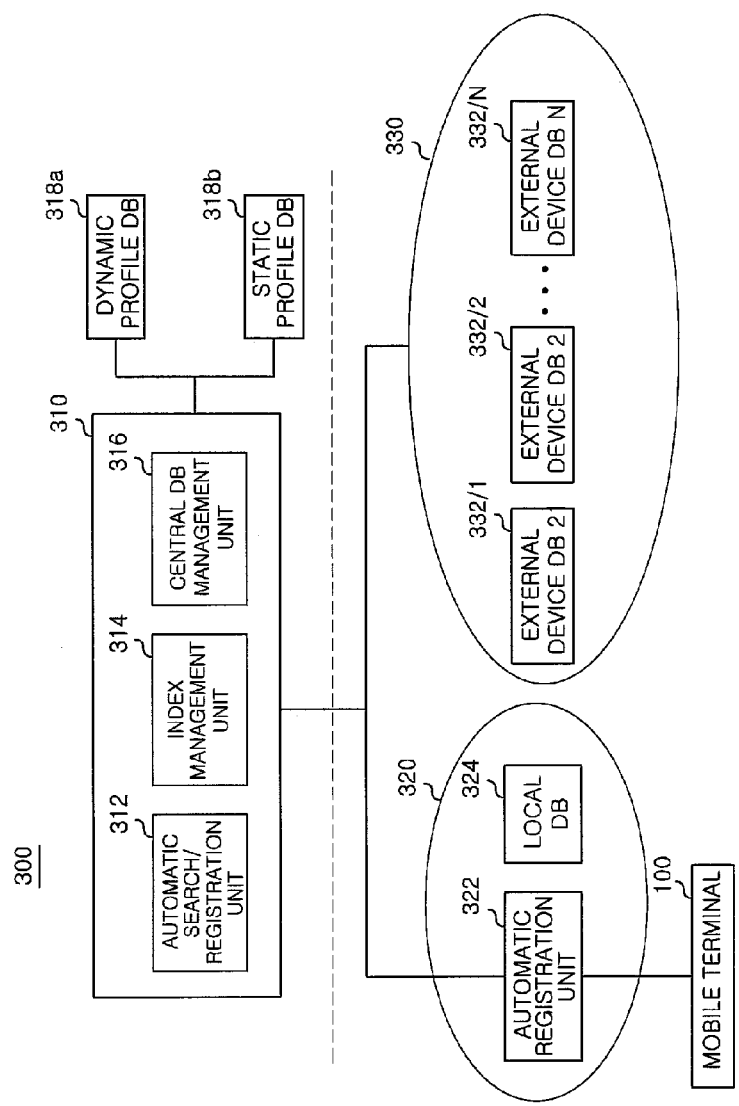
FIG. 2 illustrates a block diagram for explaining a hierarchical structure of the profile information management system of FIG. 1.

FIG. 2 illustrates a block diagram for explaining a two-level hierarchical structure of the profile information management system of FIG. 1.

Components shown in FIG. 2 may correspond to the device management agent 302 and the device profile DB 400 in FIG. 1, respectively.

As shown in FIG. 2, the profile information management system has a two-level hierarchical structure. A first hierarchy (the upper layer of FIG. 2) includes a central device management module 310, a dynamic profile DB 318a, and a static profile DB 318b. A second hierarchy (the lower layer of FIG. 2) includes a local device DB management module 320 and an external device DB management module 330.

The central device management module 310 includes an automatic search/registration unit 312, an index management unit 314, and a central DB management unit 316.

The automatic search/registration unit 312 registers profile information of a mobile terminal 100 in response to a profile information registration request from the mobile terminal 100. Further, when necessary, the automatic search/registration unit 312 sends a profile information provision request to the mobile terminal 100. The automatic search/registration unit 312 exchanges the profile information of the mobile terminal 100 with the local device DB management module 320.

The index management unit 314 cooperates with the local device DB management module 320 and the external device DB management module 330, and provides the central device management module 310 with management functions for the profile information in the second hierarchy. In preparation for receipt of a profile information modification request from the local device DB management module 320 or the external device DB management module 330, the index management unit 314 provides a mechanism for maintaining data consistency in databases of the first and the second hierarchy.

The central DB management unit 316 manages the dynamic profile DB 318*a* for storing therein the dynamic profile information and the static profile DB 318*b* for storing therein the static profile information. The central DB management unit 316 provides mechanisms for searching and maintaining the dynamic profile DB 318*a* and the static profile DB 318*b*.

The local device DB management module 320 includes an automatic registration unit 322 and a local DB 324. The automatic registration unit 322 processes the profile information received from the mobile terminal 100, and the local DB 324 stores therein the profile information to be used locally. The automatic registration unit 322 periodically performs a synchronization operation to maintain the data consistency between the profile information in the local DB 324 and in the dynamic profile DB 318*a* and the static profile DB 318*b*.

The external device DB management module 330 may be the same as one of the local device DB management modules managed by other service provider and allows the central device management module 310 to access thereto. The external device DB management module 330 may use profile formats different from those used in the central device management module 310. Various profile formats can be used as the profile formats of the external device DB management module 330.

Figure 3:
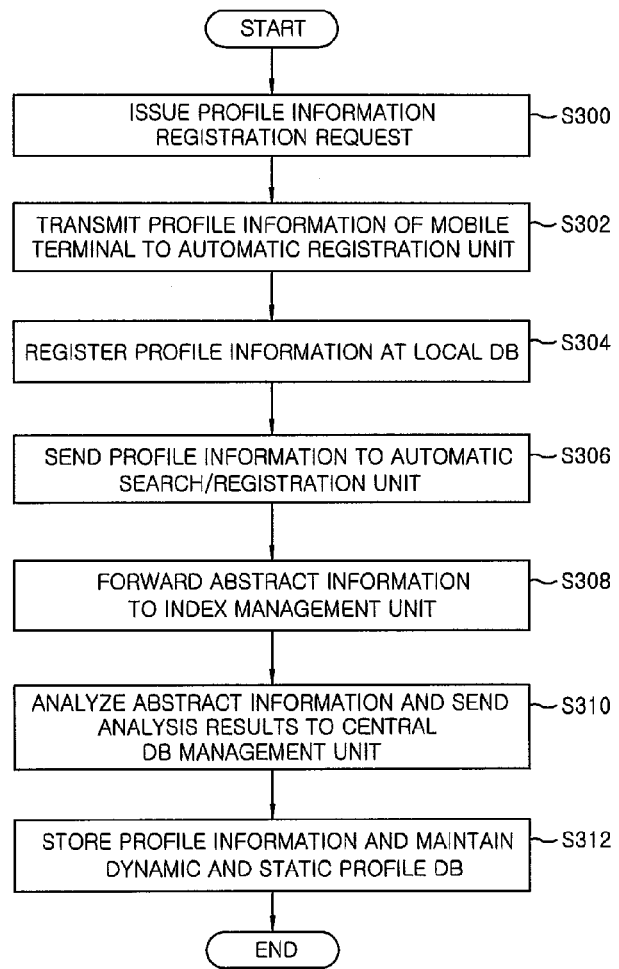
FIG. 3 illustrates a flow chart of a procedure in which a central device management module registers profile information of a mobile terminal via a local device DB management module in accordance with the present invention.

FIG. 3 illustrates a flow chart of a procedure in which the central device management module 310 registers profile information of the mobile terminal 100 via the local device DB management module 320 in accordance with the present invention.

First, a profile information registration request or modification request (step S300) is issued by a mobile terminal 100, and the profile information of the mobile terminal 100 is transmitted to the automatic registration unit 322 of the local device DB management module 320 (step S302).

The automatic registration unit 322 registers the profile information to the local DB 324 (step S304). The profile information of the mobile terminal 100 includes hardware information, software information, network information, and user information for supplementary services.

Thereafter, the automatic registration unit 322 transmits the profile information to the automatic search/registration unit 312 of the central device management module 310 (step S306). At this time, the profile information may be transmitted using HTTP (hypertext transfer protocol) protocol or SMS (short message service). Further, the profile information may be transmitted in real-time whenever the profile information is modified or at regular time intervals.

The automatic search/registration unit 312 sends simple abstract information of the profile information to the index management unit 314 (step S308). The abstract information includes a device ID (identifier), profile format information, and static/dynamic profile indicator.

The index management unit 314 classifies and analyzes the abstract information to manage an index based on the analysis results, and sends analysis results to the central DB management unit 316 (step S310). The index can be used as supplementary information for providing other application services, e.g., for rapid search of the profile information.

The central DB management unit 316 stores the dynamic profile information and the static profile information in the dynamic profile DB 318*a* and the static profile DB 318*b*, respectively, and separately manages the dynamic profile information and the static profile information of the mobile terminal 100 (step S312). The profile format of the static profile DB 318*b* may be an existing profile format currently used in the industry.

Figure 4:
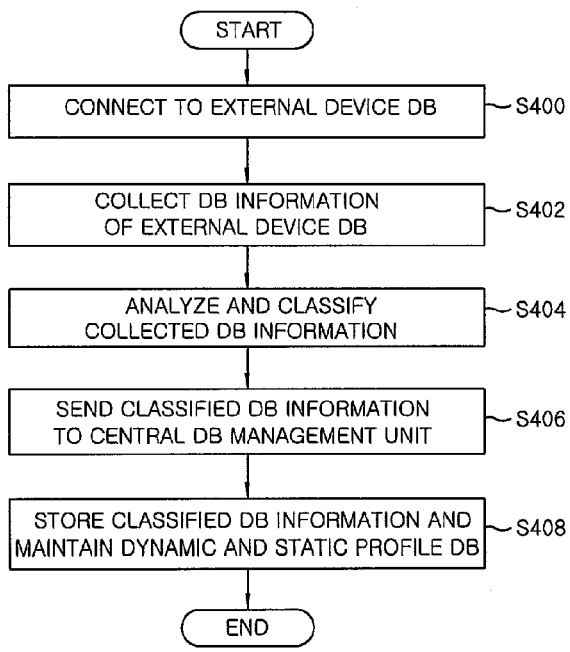
FIG. 4 illustrates a flow chart of a procedure in which a central device management module automatically searches and registers DB information of an external device DB management module in accordance with the present invention.

FIG. 4 illustrates a flow chart of a procedure in which the central device management module 310 automatically searches and registers DB (database) information of the external device DB management module 330 in accordance with the present invention.

In this embodiment, it is assumed that the profile format of the external device DB management module 330 is the same as that of the central device management module 310.

The automatic search/registration unit 312 of the central device management module 310 establishes a connection with one of the external device DBs 332/1 to 332/N, e.g., the external device DB 332/1, in the external device DB management module 330 (step S400).

The automatic search/registration unit 312 collects DB information of the external device DB 332/1 requested by the central device management module 310 (step S402).

The index management unit 314 analyzes the DB information of the external device DB 332/1 (step S404).

In the index management unit 314, the DB information is classified by using the analysis result and the classified DB information is provided to the central DB management unit 316 (step S406).

The central DB management unit 316 stores the DB information classified by the index management unit 314 in the dynamic profile DB 318*a* and the static profile DB 318*b* for maintenance (step S408).

Figure 5:
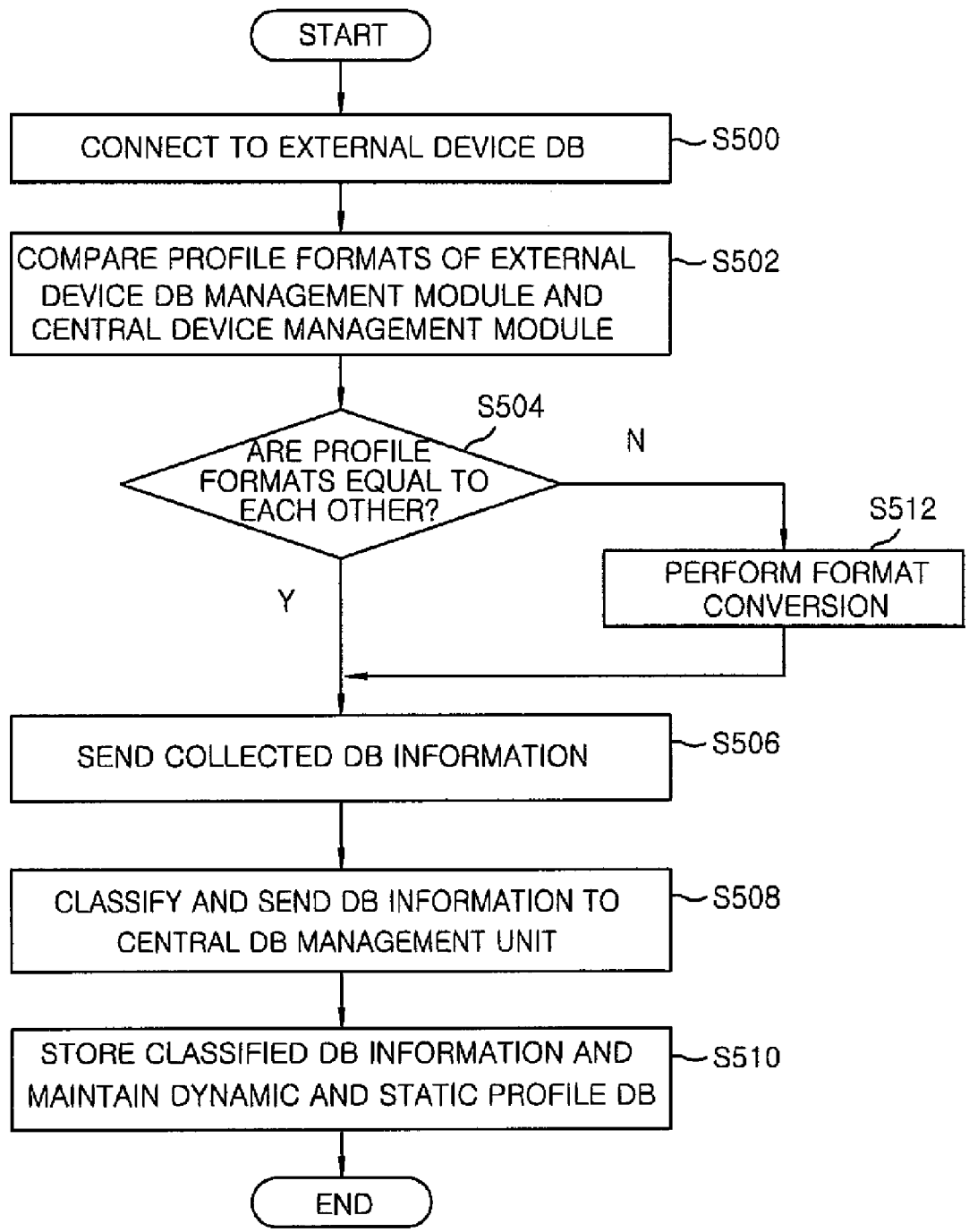
FIG. 5 illustrates a flow chart of a procedure in which a central device management module automatically searches and registers DB information of an external device DB management module in consideration of profile format of the external DB management module in accordance with the present invention.

FIG. 5 illustrates a flow chart of a procedure in which the central device management module 310 automatically searches and registers DB information of the external device DB management module 330 in consideration of profile format of the external DB management module 330 in accordance with the present invention.

In this embodiment, it is assumed that the profile format of the external device DB management module 330 may be the same as or different from that of the central device management module 310.

The automatic search/registration unit 312 of the central device management module 310 establishes a connection with one of the external device DBs 332/1 to 332/N, e.g., the external device DB 332/1, in the external device DB management module 330 (step S500). The automatic search/registration unit 312 collects DB information of the external device DB 332/1.

The automatic search/registration unit 312 compares the profile format of the external device DB management module 330 with that of the central device management module 310 (step S502), and determines whether or not the profile formats of the two modules 310 and 330 are the same (step S504).

If it is determined in the step S504 that the profile formats of the two modules 310 and 330 are different, the automatic search/registration unit 312 performs a format conversion for supporting compatibility between different profile formats (step S512). At this time, the format conversion may be performed using metadata conversion.

If it is determined in the step S504 that the profile formats of the two modules 310 and 330 are the same or after the format conversion has been performed in the step S512, the automatic search/registration unit 312 sends the DB information of the external device DB 332/1 to the index management unit 314 (step S506).

The index management unit 314 analyzes and classifies the DB information, and then, sends the classified DB information to the central DB management unit 316 (step S508).

The central DB management unit 316 stores the classified DB information in the dynamic profile DB 318a and the static profile DB 318b for maintenance (step S510).

FIG. 6 illustrates a sequence diagram of service module and content transmission between the mobile terminal 100 and the servers 500 and 600 using profile information in accordance with the present invention.

In FIG. 6, firstly, a procedure between the mobile terminal 100 and the application service server 600 for processing an application service using profile information will be described. The procedure involves the terminal agent 102 of the mobile terminal 100, the device management agent 302 of the device management system 300, the profile DBs 318a and 318b, the content server 500, and the application service server 600 of FIG. 2. In the procedure, the device management system 300 determines, on the basis of profile information, whether the mobile terminal 100 has an optimal service module for a service request thereof. Further, the device management system 300 co-operates the application service server 600 for content format conversion.

The terminal agent 102 sends a profile information registration request to the device management agent 302 (step S600). At this time, the profile information includes information on service modules stored in the mobile terminal 100 and content formats available in the mobile terminal 100.

The device management agent 302 checks whether the profile information is a dynamic profile or a static profile, and stores the profile information in the dynamic profile DB 318a or the static profile DB 318b according to the checking result (step S602).

Thereafter, in response to a service request from the mobile terminal 100, the device management agent 302 checks the requested service and determines whether the mobile terminal 100 stores therein a service module appropriate for the requested service (step S604).

If it is determined in the step S604 that the mobile terminal 100 does not have the service module appropriate for the requested service, the device management agent 302 sends a download request for a necessary service module to the application service server 600 (step S606).

Then, in response to the download request, the application service server 600 sends the requested service module to the terminal agent 102 (step S608).

If, however, it is determined in the step S604 that the mobile terminal 100 has the service module appropriate for the requested service, the device management agent 302 determines whether a content format of the requested service is available in the mobile terminal 100 (step S610). The content format may be a mark-up language, an audio stream, a video stream, or the like.

However, if it is determined in the step S610 that the content format of the requested service is available in the mobile terminal 100, the device management agent 302 sends the content to the terminal agent 102 (step S612).

If it is determined in the step S610 that the content format of the requested service is not available in the mobile terminal 100, the device management agent 302 sends a content format conversion request to the content server 500 (step S614).

In response to the content format conversion request, a content converter 502 in the content server 500 converts the format of the content into a requested format (step S616), and the content server 500 then sends the content having converted format to the terminal agent 102 (step S618).

As described above, the present invention provides a profile information management method and apparatus for mobile terminals in a mobile communications system. Using a hierarchical structure having a central system and a local system, static and dynamic profile information of mobile terminals can be managed consistently and efficiently while considering diverse changes and extension of local environments.

While the invention has been shown and described with respect to the embodiments, it will be understood by those skilled in the art that various changes and modifications may be made without departing from the scope of the invention as defined in the following claims.

The invention claimed is:

1. A method for managing profile information of a mobile terminal in a mobile communications system, comprising:
    registering profile information of the mobile terminal at a central system via a local system, the profile information having dynamic profile information and static profile information;
    registering DB (database) information of an external local system using a same profile format as that used in the central system to thereby manage the dynamic profile information and the static profile information of the mobile terminal; and
    registering DB information of another external local system using a profile format different from that used in the central system to thereby manage the dynamic profile information and the static profile information of the mobile terminal,
    wherein registering DB information of another external local system includes:
    establishing a connection between the central system and a database of the external system using the profile format different from that used in the central system;
    collecting the DB information of the database;
    comparing the profile format used in the database with that used in the central system;
    performing, if the profile format used in the database is different from that used in the central system, a format conversion for supporting compatibility between different profile formats; and
    analyzing and classifying the DB information of the database.

2. The method of claim 1, wherein registering profile information of a mobile terminal includes:
    registering, in response to an initial profile information registration request or a profile information modification request from the mobile terminal, the profile information of the mobile terminal at a database of the local system;

transmitting the profile information registered at the local system to the central system;
classifying and analyzing device information of the mobile terminal; and
storing the profile information in a database of the central system.

3. The method of claim 2, wherein the profile information of the mobile terminal includes at least one of hardware information, software information, network information, and user information for supplementary services.

4. The method of claim 2, wherein transmitting the profile information is executed in real-time whenever the profile information is modified.

5. The method of claim 2, wherein transmitting the profile information is executed at regular time intervals.

6. The method of claim 2, wherein the device information of the mobile terminal includes at least one of identification information of the mobile terminal, profile format information, and static/dynamic profile indicator.

7. The method of claim 1, wherein registering DB information of an external local system includes:
establishing a connection between the central system and a database of the external system using the same profile format as that used in the central system;
collecting the DB information of the database; and
analyzing and classifying the collected DB information.

8. The method of claim 1, wherein the format conversion is based on metadata conversion.

9. A method for managing profile information of a mobile terminal in a mobile communications system including a device management agent of a device management server, profile databases having a dynamic profile database and a static profile database, a content server and an application service server, the method comprising:
sending, by the mobile terminal, a registration request for profile information of the mobile terminal to the device management agent;
checking, by the device management agent, whether the profile information is dynamic profile information or static profile information;
registering the profile information at the dynamic profile database or at the static profile database according to the checking result;
sending, by the mobile terminal, a request for an application service to the device management agent;
checking, by the device management agent, a type of the application service and determining whether the mobile terminal stores therein a service module appropriate for the application service;
sending, by the device management agent, a request for a download of a service module appropriate for the service to the application service server if it is determined that the mobile terminal does not have the service module appropriate for the application service;
sending, by the application service server, the service module appropriate for the application service to the mobile terminal in response to the request for the download;
determining, by the device management agent, whether a content format of the application service is available in the mobile terminal if it is determined that the mobile terminal has the service module appropriate for the application service; and
sending, by the device management agent, a content to the mobile terminal if it is determined that the content format of the application service is available in the mobile terminal.

10. The method of claim 9, further comprising:
sending, by the device management agent, a content format conversion request to the content server if it is determined that the content format of the application service is not available in the mobile terminal;
converting, by the content server, the content format of the application service in response to the content format conversion request; and
sending, by the content server, the content whose format has been converted to the mobile terminal.

11. An apparatus for managing profile information of mobile terminals in a mobile communications system, comprising:
a terminal agent installed in each mobile terminal for sending and receiving profile information of the mobile terminal through a network, the profile information having static profile information and dynamic profile information;
a content server for providing a content to the mobile terminal;
an application service server for providing an application service to the mobile terminal; and
a device management server for managing a static profile database for storing therein the static profile information and a dynamic profile database for storing therein the dynamic profile information and interoperating with the content server and the application service server,
wherein the device management server has a hierarchical structure including an upper hierarchy for centrally performing overall management of the profile information and a lower hierarchy for locally managing the profile information.

12. The apparatus of claim 11, wherein the static profile information includes initial specification of the mobile terminal at the time of shipment, and the dynamic profile information includes information on changes in the initial specification of the mobile terminal.

13. The apparatus of claim 11, wherein the upper hierarchy includes a central device management module having the static profile database and the dynamic profile database.

14. The apparatus of claim 13, wherein the central device management module further includes:
an automatic search/registration unit for registering and processing the profile information in response to a profile information registration request from the mobile terminal, and, when necessary, sending a profile information provision request to the mobile terminal;
an index management unit for maintaining, by cooperating with the lower hierarchy, data consistency between the upper hierarchy and the lower hierarchy when modifying the profile information in response to a profile information modification request from the mobile terminal; and
a central database management unit for managing and searching the dynamic profile database and the static profile database.

15. The apparatus of claim 11, wherein the lower hierarchy includes a local device database management module and an external device database management module.

16. The apparatus of claim 15, wherein the local device database management module includes:
a local database for storing therein the profile information to be used locally; and
an automatic registration unit for processing the profile information provided from the mobile terminal, and periodically synchronizing the local database with the dynamic profile database and the static profile database of the upper hierarchy.

17. The apparatus of claim 15, wherein the external device database management module employs profile format different from that used in the central device management module.

18. The apparatus of claim 11, wherein the device management server includes a device management agent for managing, in connection with the content server and the application service server, the profile information of the mobile terminal.

* * * * *